Aug. 15, 1961     M. NATHANSON     2,996,644
FLUORESCENT TUBE LIGHTING SYSTEM
Filed Aug. 18, 1949     4 Sheets-Sheet 1

Inventor
Max Nathanson
By Fetherstonhaugh & Co.
Attorneys

Aug. 15, 1961 M. NATHANSON 2,996,644
FLUORESCENT TUBE LIGHTING SYSTEM
Filed Aug. 18, 1949 4 Sheets-Sheet 4

INVENTOR.
Max Nathanson
BY Morris Spector

United States Patent Office 2,996,644
Patented Aug. 15, 1961

2,996,644
FLUORESCENT TUBE LIGHTING SYSTEM
Max Nathanson, Montreal, Quebec, Canada, assignor, by mesne assignments, to Advance Transformer Co., Chicago, Ill., a corporation of Illinois
Filed Aug. 18, 1949, Ser. No. 110,953
40 Claims. (Cl. 315—138)

This invention relates to improvements in gaseous-discharge tube lighting systems of the type described in my prior U.S. Patents Nos. 2,436,399, granted February 24, 1948; 2,436,400, granted February 24, 1948; and 2,465,031, granted March 22, 1949.

In the operation of gaseous-discharge tubes in series in accordance with the teachings of the above mentioned patents, it has been found that there is an undesirable variation in the light out-put of the tubes due to excessive inequality in the distribution of current between the tubes.

The object of the present invention is to provide simple and efficient means whereby the aforesaid inequality in the distribution of current between the series connected tubes is substantially reduced so that variations in the light out-put of the tubes is kept within more acceptable limits. Various procedures whereby this objective is accomplished, in accordance with the principles of the invention, will now be described with reference to the accompanying drawings, in which:

Figure 1:
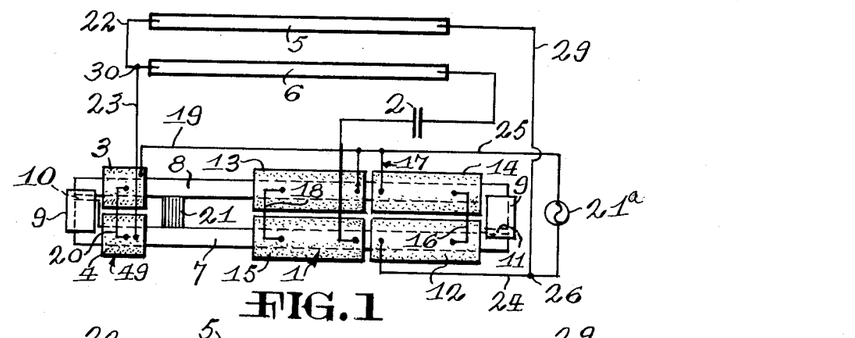
FIGURE 1 is a diagrammatic elevational view of a transformer and other component elements of a gaseous-discharge tube lighting system embodying my invention.
Figure 2:
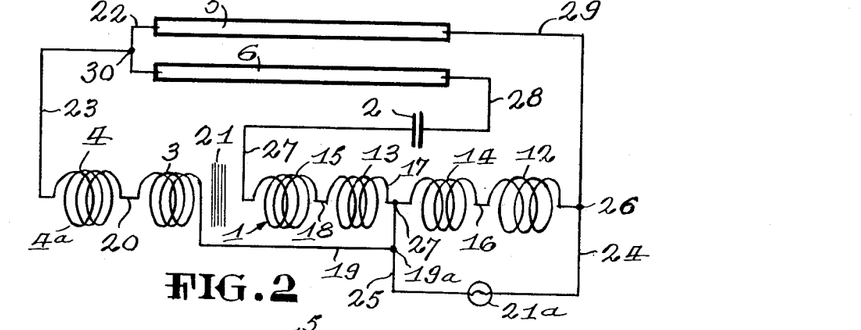
FIGURE 2 is a wiring diagram of the system shown in FIGURE 1.

In the system shown in FIGURES 1 and 2, an auto-transformer 1 is employed in conjunction with a main current limiting condenser 2 and the coil sections 3 and 4 of a teaser winding 4a to operate two series-connected gaseous-discharge tubes 5 and 6.

The core structure of transformer 1 comprises two laminated core legs 7 and 8 composed of L-shaped laminations. Instead of having their component laminations interleaved with each other in the customary manner, the core legs 7 and 8 are laterally spaced apart throughout their entire length. At each end of the transformer the spaced apart core legs are fastened together by a clamp 9. This arrangement facilitates convenient and rapid assembly of the core legs with the coil units of the transformer. It also facilitates adjustment of the spacing of the core legs to vary the width of the gaps 10 and 11 reserved between the ends of the core legs.

The primary winding of the transformer comprises a coil section 12 encircling core leg 7 and a second coil section 14 encircling the core leg 8. The secondary winding comprises a coil section 13 encircling the core leg 8 and a coil section 15 encircling core leg 7. These primary and secondary coil sections are arranged as close together as possible in the side-by-side relation shown in the drawings and are electricaly connected together in auto-transformer relation, as indicated at 16, 17 and 18. The transformer is designed so that the secondary coil sections 13 and 15 have a high inductive reactance. It will also be noted that these secondary coil sections 13 and 15 lie between the primary coils 12 and 14 and a core shunt 21 which is spaced inwardly from the left hand core clamp 9.

The coil sections 3 and 4 of teaser winding 4a are arranged on portions of the core legs 8 and 7 which lie between shunt 21 and the left hand clamp 9. The teaser coil sections are connected in auto-transformer relation by connections 16, 17, 19 and 20.

The main current-limiting condenser 2 is connected in the transformer secondary circuit so that it is in series with both of the tubes 5 and 6. The coil sections 3 and 4 of teaser winding 4a are connected to provide a high impedance by-pass through which a limited amount of current is shunted around the lamp 6 to initially establish an ionized and conductive condition of lamp 5 when the system is first put into operation.

In tracing the complete circuit connections as shown in FIGURE 2, it will be noted that primary coils 12 and 14 are connected across an alternating current potential source 21a by conductors 24 and 25. The right hand end of coil 12 is connected to conductor 24 at junction 26. The left hand end of coil section 12 is connected to the right hand end of coil section 14 by the previously mentioned connection 16. The left hand end of coil section 14 is connected to the right hand end of secondary coil section 13 by connection 17 which is also connected to conductor 25 at junction 27. The left hand end of secondary coil section 13 is connected to the right hand end of secondary coil section 15 by the previously mentioned connection 18. The left hand end of coil section 15 is connected by conductor 27 to one terminal of condenser 2. The remaining terminal of condenser 2 is connected by conductor 28 to the right hand electrode of tube 6.

The left hand electrode of tube 6 is connected by series connection 22 to the left hand electrode of tube 5. The right hand electrode of tube 5 is connected by conductor 29 to the right hand end of primary winding 12 at junction 26. The right hand end of teaser coil section 3 is connected by the previously mentioned conductor 19 to conductor 25 at junction 19a. The left hand end of teaser coil section 3 is connected to the right hand end of the companion coil section 4 by the previously mentioned connection 20. The left hand end of teaser coil section 24 is connected by conductor 23 to the series connection 22 joining the left hand electrodes of the tubes 5 and 6. The auto-transformer coils 12, 14, 13 and 15 are designed to develop a voltage which is substantially lower than the sum of the breakdown voltages required for each of the tubes 5 and 6.

In the operation of the system shown in FIGURES 1 and 2, the course voltage impressed across the primary coil sections 12 and 14 by way of conductors 24 and 25 is increased, by transformation, to a higher voltage across the terminals of the secondary circuit in which the tubes 5 and 6 and the condenser 2 are connected in series with each other. For a system using 40 watt fluorescent tubes, the higher voltage across the terminals of the secondary circuit may be of the order of 550 volts, which is approximately the voltaeg employed for operating gaseous-discharge tubes in parallel.

Figure 10:
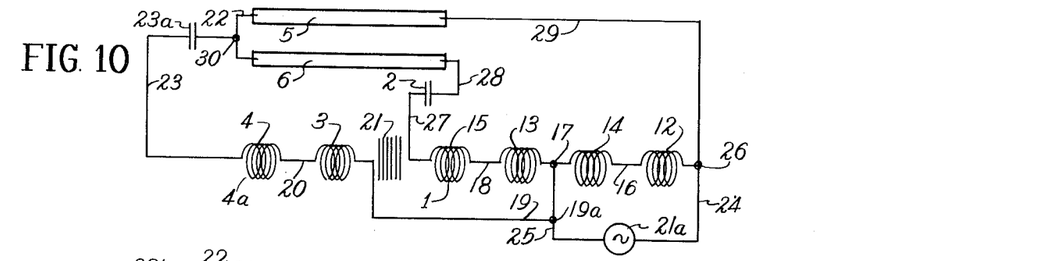
FIGS. 10, 11 and 12 are circuits similar to the circuit of FIG. 2 and utilizing, respectively, a current limiting condenser, a current limiting resistance and a current limiting inductance in the teaser coil circuit.
Figure 11:
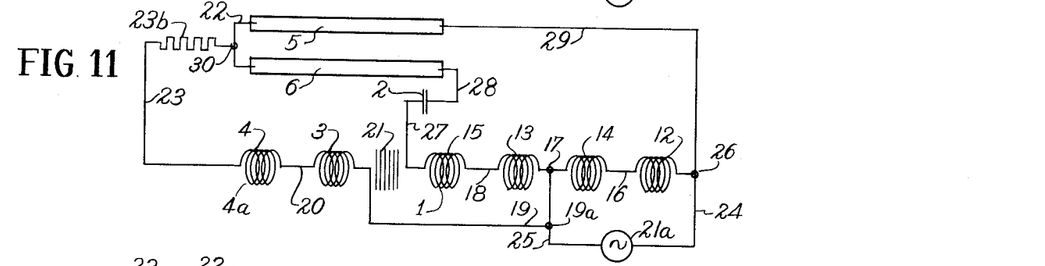
Figure 12:
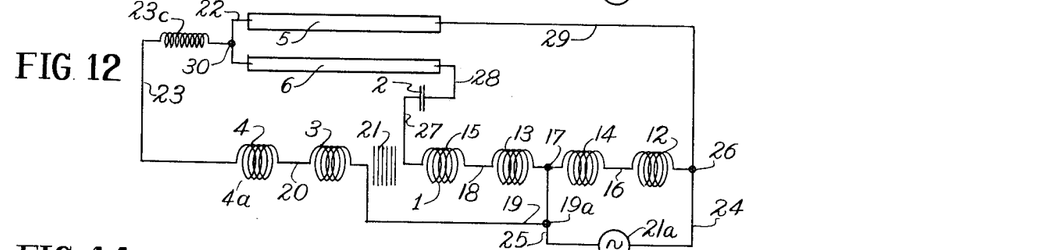

As previously stated, the coil sections 3 and 4 of the teaser winding 4a are connected in the system to provide a high impedance by-pass circuit connection through which a limited amount of current is shunted around lamp 6 at the start to initially establish an ionized and conductive condition of lamp 5. Tests have shown that, for economical design, the optimum current flow through teaser coil sections 3 and 4 should be approximately 100 milliamperes at the start. This amount of initial current flow through teaser coil sections 3 and 4 provides adequate protection against burning out of the transformer in the case where the lamp 6 has been removed from the system or is burnt out and will not ignite. It is, therefore, necessary, in order to take care of such abnormal conditions of operation, that provision be made the transformer to ensure that the teaser coils 3 and 4 have a sufficient number of turns to limit current flow through the lamps to approximately 100 milliamperes or less. Other methods of limiting current flow to prevent burning out of the lamp 6 may also be resorted to. In this connection, it would be feasible to provide external limiting impedances such as a condenser 23a, as illustrated in FIG. 10, resistance 23b, as illustrated in FIG. 11 or inductance 23c, as illustrated in FIG. 12, said condenser 23a of FIG. 10, or resistance 23b of FIG. 11, or inductance 23c of FIG. 12 being in the connection provided between the left hand end of teaser coil section 4 and the series connection 22 joining the left hand electrodes of tubes 5 and 6.

When the teaser coil sections 3 and 4 are formed with a large number of turns to prevent burning out of the transformer in the event of abnormal conditions such as the removal or burning out of the tube 6, the shunt 21 may be so designed or adjusted that the flux linkage between the teaser coil sections 3 and 4 and their respective portions of the core legs 8 and 7 is limited to develop a voltage under 600 volts for a system employing 40 watt tubes. Once lamp 5 is lgnited, there is sufficient voltage available through the transformer coils 12, 14, 13 and 15 to ionize the ignite lamp 6 so that current then flows through both lamps 5 and 6 in an amount which is limited only by the impedance of condenser 2. However, when current flow through coils 13 and 15 is established, most of the magnetic flux is shunted through shunt 21 and there is very little flux linkage with the coils 3 and 4 with the result that the additional current flow through lamp 5 by way of the bypass provided by the teaser coil sections 3 and 4 is limited to 15 milliamperes or less depending on the adjustment of the shunt 21.

In the operation of the system described herein, the action is very rapid. Lamp 5 is ignited first and a current of approximately 100 milliamperes flows therethrough. A fraction of a second later the lamp 6 is ignited with proper current flow therethrough. If an ammeter is placed in the conductor connection 23 it will show a high inrush current flow which, when lamp 6 is ignited, falls to 15 milliamperes or less. It will also be seen that, since very little current flows through teaser coil sections 3 and 4 under normal operating conditions, the loss through these coil sections is negligible.

If desired, the teaser coil sections 3 and 4 may be connected in reverse polarity with primary coils 12 and 14 to increase the impedance of coil sections 3 and 4 and thereby provide further limitation of current flow under normal operating conditions such as would exist in the case where the lamp 6 is burned out or has been removed from the system.

Since a leading current flows in the series circuit including the condenser 2 and the tubes 5 and 6, it is possible, by adjustment of the width of the gaps 10 and 11 in the core magnetic flux circuit, to obtain a high power factor of 90% or higher. In addition to its high power factor and efficiency, the transformer described herein insures quick starting of the tubes and may be manufactured and sold at a relatively low cost compared with standard transformers. The shunt 21 serves to improve the output by improving the wave shape characteristics of the current flowing through tubes 5 and 6.

Figure 3:
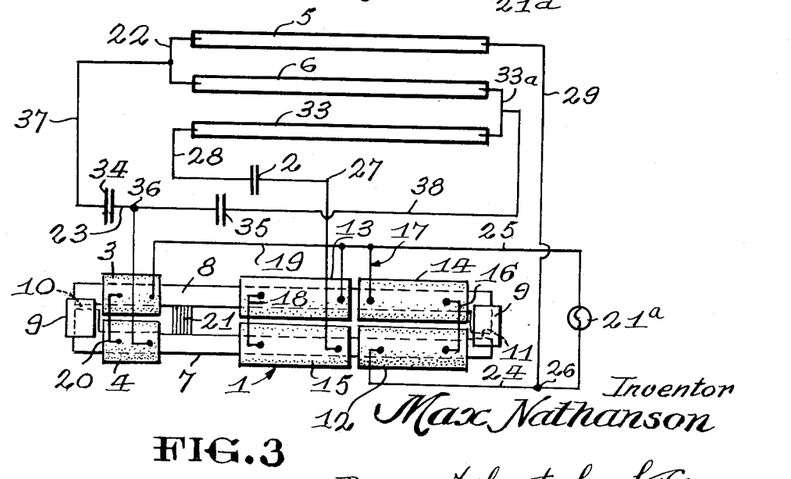
FIGURE 3 is a view similar to FIGURE 1 but illustrating a modification of the invention.
Figure 4:
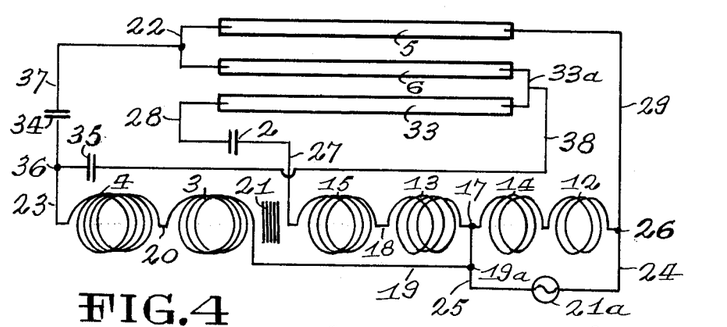
FIGURE 4 is a wiring diagram of the modified system shown in FIGURE 3.

In the modified systems shown in FIGURES 3 and 4 a third tube 33 is connected in the system in series with tubes 5 and 6. In this case, the right hand electrode of tube 6 is connected, by series connection 33a, to the right hand electrode of tube 33. The left hand electrode of tube 33 is connected to the left hand end of secondary coil section 15 by way of conductor 28, condenser 2 and conductor 27. Condensers 34 and 35 are included in the system with one terminal of each condenser connected to conductor 23 at junction 36. The remaining terminal of condenser 34 is connected, by conductor 37, to the series connection 22 joining the left hand electrodes of tubes 5 and 6. The remaining terminal of condenser 35 is connected, by conductor 38, to the series connection 33a, joining the right hand electrodes and tubes 6 and 33.

In the operation of the system shown in FIG. 4 the three tubes 5, 6 and 33 are ignited in rapid sequence by first establishing an ionized and conductive condition in tube 5; then in tube 6 and, finally, in lamp 33. When the three tubes are ignited, the current flow therethrough is limited to proper proportion by condenser 2. Due to the flux by-passing effect of shunt 21 very little voltage is generated by teaser coil sections 3 and 4 and therefore the additional current flow resulting from the presence of these coils in very small.

Figures 13, 14:
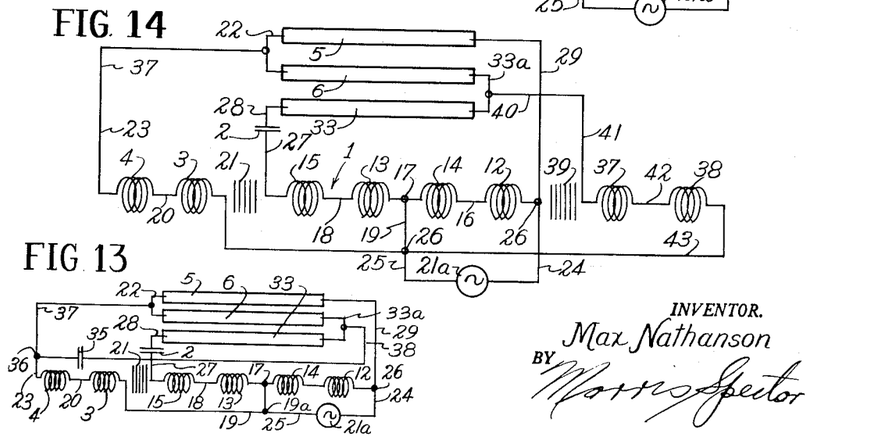
FIG. 13 is a circuit similar to that of FIG. 4 wherein the impedance of the tickler coils is sufficiently high to permit omission of the current limiting condenser in the tickler circuit.
FIG. 14 is a circuit similar to FIG. 6 but omitting the current limiting condensers in the tickler coil circuits.

The condenser 34 is designed to limit current flow in lamp 5 to very low proportions. This condenser may be omitted if the impedance of coils 3 and 4 is sufficiently high. Condenser 35 serves to limit the current flow through tube 6 to suitable low proportions. A circuit similar to that of FIG. 4 but wherein the impedance of the coils 3 and 4 is sufficiently high to limit the current flow in the lamp 5 to very low proportions is illustrated in FIG. 13. Since the impedance of the coils 3 and 4 is sufficiently high for the purposes stated, it follows, as stated above, that the condenser 34 of FIG. 4 is unnecessary and therefore omitted from the circuit of FIG. 13. In other respects the circuit of FIG. 13 is identical with that of FIG. 4, being a circuit for use with a ballast of FIG. 3 except for the omission of the condenser 34 from the ballast of FIG. 3 and the use of coils 3 and 4 of greater impedance.

In the circuit of FIGS. 3 and 4, since the condenser 34 is designed to limit the current flow in the lamp 5 to very low proportions during the starting of the lamp 5, it follows that the starting circuit which includes the lamp 5, condenser 34, impedance coils 3 and 4 and the primary must be a leading circuit, that is, the capacity reactance 34 must be greater (more than twice as great) than the inductive reactance in that circuit. This follows from the fact that the inclusion of a capacity reactance (such as 34) in a circuit which is otherwise a lagging circuit would reduce the total reactance in the circuit unless the added capacity reactance is more than twice the inductive reactance of that circuit.

In the circuit of FIG. 13, the current flow through the lamp 5 during starting is, as stated above, limited by the use of higher impedance coils 3 and 4, rather than the use of the condenser 34 of FIGS. 3 and 4. Therefore, in the circuit of FIG. 13, the current flowing through the lamp 5 during starting is a lagging current. As soon as this current commences to flow upon starting of the lamp 5, there will be a change of phase of the induced voltage in the coils 3—4 due to the high leakage reactance of those coils. This change in phase causes the coils 3—4 immediately to become bucking coils. The voltage of the coils 3—4 is now additive with the voltage of the coils 13—15 over a series circuit including the lamp 33. This circuit may be traced as follows (FIG. 13): Point 17 through coils 13—15, condenser 2, lamp 33, conductor 38, condenser 35, point 36, then over two branches one of which branches goes through the coils 4—3, conductor 19, point 19a, back to the point 17, and the other branch from the point 36 goes to the conductor 37, conductor 22, ignited lamp 5, conductor 29, primaries 12—14, to point 17. In the first branch, the voltage of the coils 13—15 is cumulative with the voltage of the coils 3—4. In the second branch the voltage of the coils 13—15 is cumulative with the line voltage or primary voltage. It thus follows that the lamp 33 will be the second lamp to light. After this occurs, the voltage of the secondaries 13—15 with the primary is connected across the three lamps of which the lamps 5 and 33 are already ignited, so that the voltage drop across those lamps is low so that the remaining voltage across the lamp 6 is sufficient to light the lamp 6, whereupon the three lamps continue to operate in series, with the current limiting condenser 2 and across the primary and the secondary 13—15 in step-up auto-transformer relationship.

Figure 5:
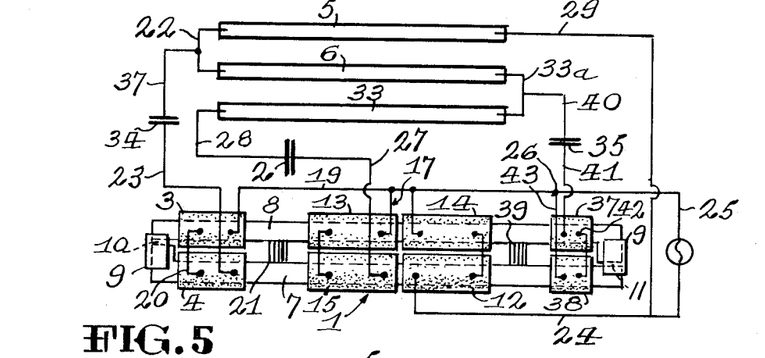
FIGURE 5 is a view similar to FIGURE 1 but showing a further modification.
Figure 6:
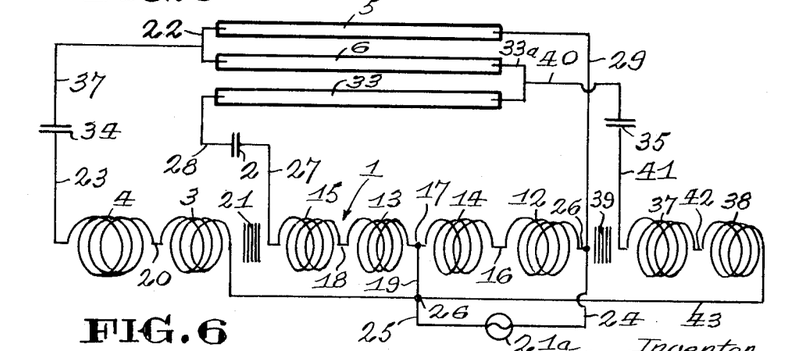
FIGURE 6 is a wiring diagram of the modified system shown in FIGURE 5.

The modified system shown in FIGURES 5 and 6 differs from that shown in FIGURES 3 and 4 mainly by provision of two additional teaser winding coil sections 37 and 38 arranged, respectively, on the core legs 7 and 8 between the right hand core clamp 9 and an additional core shunt 39 lying at the right hand side of primary winding coil sections 12 and 14. In this case, the condenser 35, instead of being connected as shown in FIGURES 3 and 4, has one terminal connected by conductor 40 to the series connection 33a joining the right hand electrodes of tubes 6 and 33, the remaining terminal of condenser 35 being connected by conductor 41 to the left hand end of teaser coil section 37. The right hand end of teaser coil section 37 is connected as indicated at 42 to the left hand end of teaser coil section 38. The right hand end of teaser coil section 38 is connected by conductor 43 to conductor 25 at junction 26. The condensers 34 and 35 may be omitted from the system shown in FIGURES 5 and 6 if the impedance of the teaser coils 3, 4, 37 and 38 is sufficiently high to give the required limitation of current flow.

Figure 7:
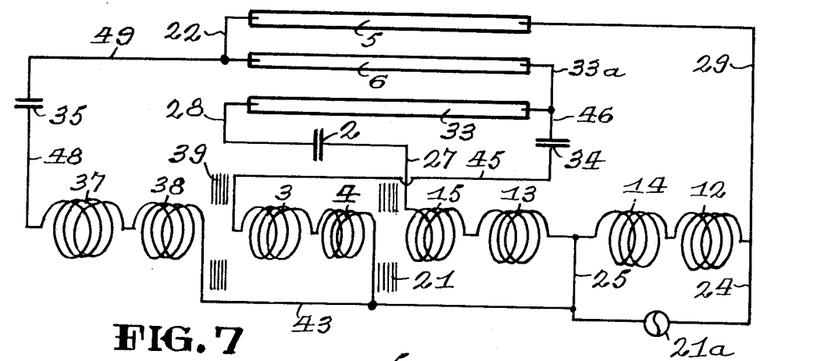
FIGURE 7 is a wiring diagram illustrating a further modification of the three tube systems shown in FIGURES 3 to 6 inclusive.

This is illustrated in FIG. 14. FIG. 14 differs from FIG. 6 only in that the condenser coils are of higher impedance, sufficient to give the required limitation of current flow, so that the condensers 34 and 35 of FIGS. 5 and 6 can be and are omitted, FIGURE 7 shows a slight modification of the system shown in FIGURES 5 and 6. In this case, the teaser coil sections 3, 4, 37 and 38 and the core shunts 21 and 39 are located at the left of the secondary winding 13 and 15. In the system shown in FIGURE 7, the condenser 34 has one terminal connected by conductor 45 to the left hand end of teaser coil 3, the remaining terminal of said condenser being connected by conductor 46 to the series connection 33a joining the right hand electrodes of tubes 6 and 33. The condenser 35 has one terminal connected by conductor 48 to the left hand end of teaser coil 37, the remaining terminal of condenser 22 joining the left hand electrodes of tubes 5 and 6.

Figure 8:
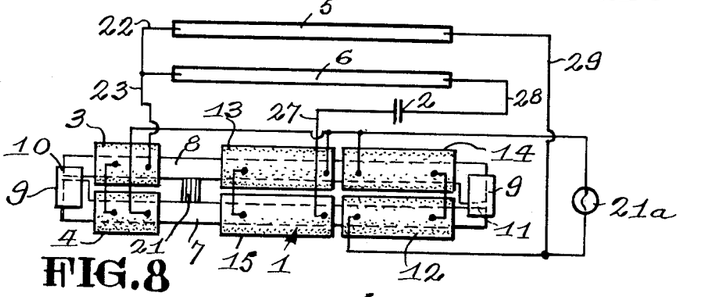
FIGURE 8 is a view similar to FIGURE 1 but showing a still further modification.
Figure 9:
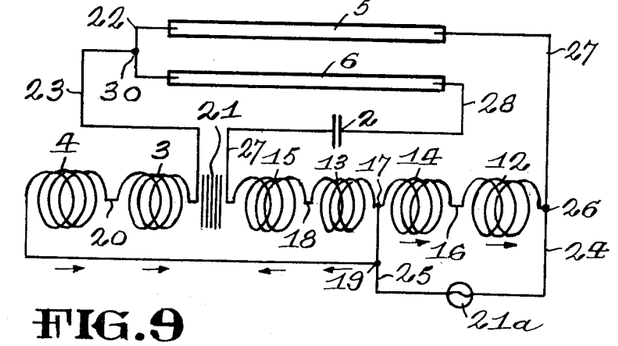
FIGURE 9 is a wiring diagram of the modified system shown in FIGURE 8.

The system shown in FIGS. 8 and 9 differs from that shown in FIGS. 1 and 2 merely by reason of the fact that, in the case of FIGS. 8 and 9, the teaser coil sections 3 and 4 are used as bucking coils connected in reverse polarity with primary winding coil sections 12 and 14 to improve the quick starting characteristics of the system and to increase the impedance of teaser coils 3 and 4 so that when lamp 6 is burned out or removed from the system the resultant current flow through teaser coils 3 and 4 and lamp 5 will be kept at a low value below 100 milliamperes.

A transformer suitable for use in the system shown in FIGS. 8 and 9 may be constructed in the following manner: The core legs 7 and 8 are each composed of 8 L-shaped laminations stacked one upon the other to provide a laminated core leg whose cross sectional dimensions are approximately 1½ in. x 1 in. Primary winding coils 12 and 14, each consisting of 465 turns of No. 22 wire, are then placed on their respective core legs as shown in the drawings. Secondary coil sections 13 and 14, each consisting of 1,575 turns of No. 26 plain enamel wire, are then arranged on their respective core legs. The teaser coils 3 and 4, each consisting of approximately 3000 turns of No. 33 plain enamel wire, are then placed on the core legs in their proper position. The corresponding ends of the two core legs are then fastened together by the clamps 9 so as to leave the required gaps 10 and 11 in the core circuit. The magnetic shunt 21, consisting of suitable steel laminations is placed between coils 3 and 15 and adjusted to leave a gap of approximately .005 in. between the shunt and the core leg 8. It is important to note that the shunt 21 is placed in the direction of rather than at right angles to the direction of flux flow.

For power factor correction purposes it may be necessary, in some cases, to place an .005 in. spacer between the core legs at the gap points 10 and 11. The extra exciting current obtained will tend to balance out leading current characteristics of the circuit and to provide a power factor of over 90%.

The coils 12, 14, 13 and 15 are connected so that their voltages are additive to provide approximately 500 volts in the case of a system energized by 110 volt 60 cycle source of alternating current energy.

The connections of the teaser coils 3, 4, and primary coils 12 and 14 are such in FIGS. 8 and 9, that the voltage of the coils 3 and 4 has a bucking effect on the voltage of the coils 12 and 14, thus increasing the impedance of coils 3 and 4 as compared with the system shown in FIGS. 1 and 2.

Having thus described the nature of my invention and several different embodiments, it will be understood that various modifications may be resorted to within the scope and spirit of the invention as defined by the appended claims. In this connection it will be understood that each of the current limiting condensers shown in the various circuits may be replaced by resistances, inductances, or other suitable types of current limiting impedances designed to give the same current limiting effect. It will also be understood that in the case of a system such, for example, as that shown in FIGS. 1 and 2, a thermally operated switch may be employed in the connection 23 to break the connection between the teaser coils 3 and 4 and the tubes 5 and 6 in response to overheating of the coils 3 and 4.

I claim:

1. In a lighting system having a plurality of gaseous discharge lamps in series, a transformer core structure, primary and secondary windings arranged on said core, the primary winding being adapted for connection to a feeder source of alternating potential, the lamps being connected only in series in a series circuit, the series circuit comprising the lamps together with a capacitive current-limiting impedance and the secondary winding, the secondary winding generating an operating potential of a value less than the sum of the starting potentials of the lamps, and a high impedance teaser winding arranged on the core, said high impedance teaser winding being in a circuit by-pass branch which is connected across a portion of the series circuit, which portion comprises the current-limiting impedance and at least one lamp, the teaser branch providing sufficient potential in a series path between adjacent lamps to start a lamp in one portion of the series circuit, the potential of the secondary being sufficient to then start a lamp in another portion, whereby a plurality of tubes connected only in series can be started and operated on a potential less than the sum of the starting potentials of all of the tubes in the series circuit.

2. In a lighting system according to claim 1 wherein said series circuit contains two lamps.

3. In a lighting system according to claim 1 wherein said series circuit contains more than two lamps and wherein additional teaser by-pass paths are provided across predetermined portions of the series circuit.

4. In a system having a plurality of gaseous discharge devices in series, a transformer core structure, primary, secondary and auxiliary windings arranged on said core, the primary winding being adapted for connection to a feeder source of alternating potential, the devices being connected only in series in a series circuit, the series circuit comprising said devices together with a capacitive current-limiting impedance and the secondary winding, the auxiliary winding having a high impedance, said high impedance auxiliary winding being in a branch circuit which is connected across a first portion of the series circuit, the branch circuit being characterized by absence of other reactive impedance, said first portion comprising the current-limiting impedance and at least one but less than all of said devices, the branch circuit providing sufficient potential at a point in a section of the series circuit extending between adjacent devices to start at least one of the remaining devices in a second portion of the series circuit, the potential of the transformer windings being then sufficient to start a device in the first portion, whereby a plurality of devices connected only in series can be started and operated on a potential less than the sum of the starting potentials of all of said devices in the series circuit.

5. The combination of claim 4 in which said primary winding is connected in series in said series circuit.

6. The combination of claim 4 in which said primary winding is connected in series in said second portion of said series circuit.

7. The combination of claim 4 in which said plurality of gaseous discharge devices consists of two such devices, one each in said first and second portions of said series circuit.

8. The combination of claim 4 in which said plurality of gaseous discharge devices consists of more than two devices and in which additional auxiliary circuit branches are provided across predetermined portions of the series circuit.

9. Apparatus for starting and operating a pair of gaseous discharge devices connected only in series in a series circuit, comprising a transformer core structure, primary, secondary and auxiliary windings arranged on said core, said auxiliary winding having high impedance, the primary winding being adapted for connection to a feeder source of alternating potential, a capacitive current-limiting impedance, means for connecting said primary and secondary windings and said current-limiting impedance in a series operating circuit to be completed by said pair of devices in series, said high impedance auxiliary winding being in a branch circuit for connection across a first portion of such series operating circuit, said branch circuit being characterized by the absence of other reactive impedance, said first portion comprising said current-limiting impedance and only one of said pair of devices, said branch circuit providing sufficient potential to be applied at a point in a section of the series circuit extending between said devices to start the other one of said pair of devices in the second portion of such series operating circuit, the potential of the transformer windings being then sufficient to start said one of said pair of devices, whereby a pair of devices connected only in series can be started and operated on a potential less than the sum of the starting potentials of both of said devices in the series circuit.

10. The combination of claim 9 in which the transformer core structure is provided with high magnetic leakage shunt means between the primary winding and the high impedance auxiliary winding.

11. Apparatus for igniting a pair of gaseous discharge devices and operating the same from a low voltage A.C. source which comprises a transformer having three windings comprising a primary, first secondary and second secondary, the secondaries being in reverse voltage relationship one to the other, lead means for forming a series circuit for one of said devices across two windings, lead means for forming a series circuit for the other of said devices across two windings, the first of said secondaries being common to each circuit and having relatively high inductive reactance whereby to impede flow of current therethrough after ignition of both devices and forcing the current to flow in series through the devices and the second secondary.

12. Apparatus for igniting a pair of gaseous discharge devices and operating same from a low voltage source of alternating current, which comprises a transformer having an iron core, three windings mounted upon the core and comprising a primary, a first secondary, and a second secondary, means for connecting said devices in two separate series circuits across two parts of said transformer, one part including at least said first secondary and excluding said second secondary, and the second part including at least both secondaries, whereby the said first secondary is common to each of said circuits formed, said secondaries being arranged in voltage bucking relationship one to the other on said core with said first secondary physically spaced from the other two windings to provide very loose coupling and high leakage reactance therein during operation, whereby current flow will be impeded therethrough during operation forcing flow of current substantially to by-pass the same to provide an effective series circuit through said devices and the said second secondary.

13. Apparatus of the character described comprising an auto-transformer for igniting and operating a pair of gaseous discharge devices from a source having a voltage substantially lower than the igniting voltage of either of said devices, and having three windings inductively arranged one relative to the other and comprising a primary, a first secondary, and a second secondary, means for connecting one of said devices in a circuit across the primary and first secondary together, means for connecting the second of said devices in a circuit across the secondaries together, the secondaries being arranged with their open circuit voltages opposing one another in said mentioned circuit, the primary and first secondary having sufficient turns to provide a voltage for igniting the first of said devices when the primary is energized by said source, and the secondaries having sufficient turns to provide a voltage for igniting the second device but being inductively arranged additively to combine their voltages only after ignition of said first device, and means comprising a magnetic shunt establishing a high leakage reactance in said first secondary to prevent substantial passage of current therethrough after ignition of both devices so that the devices and second secondary are connected in an effective series circuit.

14. A lamp ballast for operating two discharge devices comprising a primary, a first secondary, a second secondary, a pair of terminal leads for extending connections to a discharge device, the terminal leads and the secondaries being so connected that when a load is across the terminal leads it forms a loop with the two secondaries and the voltages of said secondaries in opposition to one another in said loop prior to the flow of current through the secondaries whereby at that time the voltage across the terminal leads is substantially the difference between the voltages across the two secondaries, another terminal lead extending from the loop for connection in a circuit leading to another discharge device, the loop circuit being connected in circuit with the primary at a point on the loop such that only the first of the two secondaries lies between that point and the other terminal lead and that first secondary being in step-up auto-transformer relationship to the primary, a magnetic structure coupling the primary with the two secondaries, the secondaries being more closely coupled to the primary than to one another, said first secondary taking a lagging current upon starting of current flow therethrough whereby after current commences to flow therethrough the direction of the voltage across the first secondary is substantially reversed with respect to the voltage induced in the other secondary and the voltage across said first terminal leads becomes substantially the sum of the voltages across the two secondaries, said first secondary being of substantially higher reactance than that of the other secondary whereby in operation of the ballast said first terminal leads in series with the second secondary are shunted by the higher reactance secondary, and the circuit which includes the first terminal leads in series with the secondary and shunted by the higher reactance secondary is in series with said other terminal lead.

15. Apparatus for igniting a pair of discharge devices and operating same from a low voltage source of alternating current, which comprises a transformer having a primary, a first secondary, and a second secondary, leads for connecting to a discharge device, said leads being in a series circuit including the primary and only the first one of the two secondaries, leads for connecting another discharge device in a loop which includes both secondaries with their open circuit voltages in opposition in said loop and which excludes the primary, the first secondary being more closely coupled with the primary than it is with the second secondary and having a relatively high inductive reactance whereby to impede flow of current therethrough after ignition of the devices, and thereby forcing the current to flow in series through said devices and the second secondary.

16. In a device of the character described adapted to seriatim ignite and series operate at least a pair of gaseous discharge devices from a low voltage A.C. source and which comprises a transformer having three windings comprising a primary winding, a high leakage reactance first secondary winding, and a second secondary winding, the said windings being mounted side by side along an elongate iron core, with the primary winding between the secondaries and substantially more closely coupled to the second secondary than to the first secondary winding whereby to provide said high leakage reactance in the said first secondary winding, a first gaseous discharge device and a capacitor connected with said discharge device in a series loop including said first secondary winding but excluding the second secondary winding, a second gaseous discharge device connected in a second series loop which includes both secondary windings, means for blocking flow of D.C. current resulting from abnormal operation of the second gaseous discharge device through the said first secondary winding without affecting the normal operation of the apparatus which comprises a capacitor in said second series loop.

17. A device as described in claim 16 in which the open circuit voltage relationship of the secondaries one to the other is bucking.

18. In a device of the character described adapted to seriatim ignite and series operate at least two gaseous discharge devices from an A.C. voltage source whose voltage is substantially less than the igniting voltage of any device, and which comprises a transformer having three windings including a primary winding connected to said source, a first secondary winding, and a second secondary winding, the first secondary winding being spaced from the primary winding and there being a shunt between the primary and first secondary windings whereby to engender a high leakage reactance in said first secondary winding, and said first secondary winding being formed of a relatively large number of turns of fine wire compared to the number of turns and size of wire of the other windings, one gaseous discharge device being connected in a series loop having therein a capacitor and the primary and first secondary windings excluding the second secondary winding, a second gaseous discharge device being connected in a second series loop with both of the secondary windings and excluding the primary winding, the turn ratios of the windings being such that when the primary winding is energized the devices will ignite in the order named due to the high igniting voltage initially developed in the first secondary winding and added to that of the primary winding to ignite the first device, followed by a quadrature component in said first secondary winding additive to the voltage of the second secondary winding to ignite the second device, after which current will flow in series through the devices, the series capacitor and the second secondary and by-pass the first secondary winding, and means for preventing the flow of direct current through said first secondary winding due to abnormal operation of said second device comprising a second capacitor connected in series with said second secondary winding in said second loop at a point where all the current passing through said second secondary winding will be required to pass through said second capacitor.

19. Apparatus of the character described adapted to ignite and thereafter operate at least a pair of gaseous discharge devices from an A.C. source of relatively low voltage which includes an auto-transformer having a primary, first secondary and second secondary windings, the first secondary winding being loosely coupled to the primary winding, there being a shunt separating the primary and first secondary windings, two gaseous discharge devices, one side of the first secondary winding being connected to one terminal of the primary winding and being in no-load additive voltage relationship thereto, said second secondary winding being loosely coupled relative to the other windings and having one side thereof connected to a terminal of said first secondary winding and being in no-load bucking voltage relationship thereto, a capacitive reactor in series with one device and together therewith connected across the combined primary and first secondary windings to form a series loop therewith, the second gaseous discharge device being connected across and in series loop with said first and second secondary windings, said primary winding being connected to said source, and a second capacitive reactor connected in series in the second loop in a portion thereof not common with the first loop.

20. In a gaseous discharge tube lighting system, a transformer including a core provided with an air gap and primary and secondary windings arranged on said core, the primary coil being connected across a source of alternating current of predetermined frequency, a pair of output terminals for the transformer connected one to one end of the primary and the other to one end of the secondary, the opposite end of the secondary being connected to the primary, a tube circuit comprising at least a pair of gaseous discharge tubes connected in series with each other across the output terminals of the transformer, a series condenser connected in the tube circuit in series with both tubes, a by-pass impedance connected in the tube circuit in series with one tube and in parallel with the other tube, the transformer secondary being arranged to have an inductive reactance in the operating frequency which is lower than the impedance of the said series condenser and the by-pass impedance at the operating frequency, and the transformer primary by reason of the air gap carrying an appreciable exciting current, the arrangement of the system being such that the exciting current is inductive and lagging in nature and combined vectorially with the leading load current to provide a high power factor operation with a minimum of wave shape distortion.

21. In a lighting system having a plurality of gaseous discharge lamps in series, a transformer core structure, primary and secondary windings arranged on said core, the primary winding being adapted for connection to a source of alternating potential, the lamps being connected only in series in a series circuit, the series circuit comprising the lamps together with a capacitive current-limiting impedance and the secondary winding, the secondary winding generating an operating potential of a value less than the sum of the starting potentials of the lamps, and a high impedance teaser winding arranged on the core, the secondary being more closely coupled with the primary winding than with the teaser, said high impedance teaser winding being in a circuit by-pass branch which is connected across a portion of the series circuit, which portion comprises the current-limiting impedance and at least one lamp, the teaser branch providing sufficient potential in a series path between adjacent lamps to start a lamp in one portion of the series circuit, the potential of the secondary being sufficient to then start a lamp in another portion, whereby a plurality of tubes connected only in series can be started and operated on a potential less than the sum of the starting potentials of all of the tubes in the series circuit.

22. In a lighting system having a plurality of gaseous discharge lamps in series, a transformer core structure, primary and secondary windings arranged on said core, the primary winding being adapted for connection to a source of alternating potential, the lamps being connected only in series in a series circuit, the series circuit comprising the lamps together with a capacitive current-limiting impedance and the secondary winding, the secondary winding generating an operating potential of a value less than the sum of the starting potentials of the lamps, and a high impedance teaser winding arranged on the core, the secondary being more closely coupled with the primary winding than with the teaser, means forming a magnetic flux path for the leakage flux of the teaser winding, said flux path excluding the primary and excluding the secondary and having an air gap therein to prevent saturation thereof, said high impedance teaser winding being in a circuit by-pass branch which is connected across a portion of the series circuit, which portion comprises the current-limiting impedance and at least one lamp, the teaser branch providing sufficient potential in a series path between adjacent lamps to start a lamp in one portion of the series circuit, the potential of the secondary being sufficient to then start a lamp in another portion, whereby a plurality of tubes connected only in series can be started and operated on a potential less than the sum of the starting potentials of all of the tubes in the series circuit.

23. In combination with a gaseous discharge device, a transformer having a primary, a secondary winding connected in auto-transformer relation with the primary, means for connecting said primary to a relatively low voltage A.C. source of power for excitation thereof, an element of high reactance inductively arranged relative to the primary, means connecting the gaseous discharge device across said secondary and said element in tandem, said element being in series voltage relationship with and serving to provide a voltage component additive to the voltage of the said secondary winding but only after current flows in said element, and means connected with said element for causing said current to flow therein upon energization of the primary, said element being arranged in voltage bucking relationship with said winding prior to flow of current therethrough and said additive voltage component being produced by reason of the phase reversal therein when said current flows.

24. An operating circuit for two discharge devices, comprising a transformer having a primary, a first secondary, and a second secondary, a first gas discharge device connected in a circuit including at least a major portion of the primary and the first one of the two secondaries and excludes the second one of the two secondaries, a second gas discharge device connected in a loop which includes both secondaries with their open circuit voltages in opposition in said loop and which excludes the primary, the first secondary being less closely coupled with the primary than it is with the second secondary and having a relatively high inductive reactance whereby to impede flow of current therethrough after ignition of the devices, and thereby forcing the current to flow in series through said devices and the second secondary.

25. A system of the character described which comprises a transformer having an iron core and a primary winding, a first secondary winding, and a second secondary winding on said core, a gaseous discharge device connected in a circuit which includes said first secondary and excludes said second secondary, a second gaseous discharge device connected in a circuit which includes both secondaries, whereby the said first secondary is common to each of said circuits, said secondaries being arranged in voltage bucking relationship one to the other on said core with said first secondary physically spaced from the other two windings to provide very loose coupling and high leakage reactance therein during operation, whereby current flow will be impeded therethrough during operation forcing flow of current substantially to by-pass the same to provide an effective series circuit through said devices and the said second secondary.

26. In combination with a gaseous discharge device, a transformer having a primary and a secondary, an element of high reactance inductively arranged relative to the primary, means connecting the gaseous discharge device in a circuit including at least said secondary and said element, the open circuit voltage of said secondary and said element being less than the ignition voltage of said device, said element serving to provide a voltage component additive to the voltage of the said secondary but only after current flows in said element, and means connected with said element for causing said current to flow upon energization of the primary, said element being arranged in voltage bucking relationship with said secondary prior to flow of current therethrough and said additive voltage component being produced by reason of the phase reversal therein when said current flows.

27. In combination with a gaseous discharge device, a transformer having a primary and a secondary winding, an element of high reactance inductively arranged relative to the primary, means connecting the gaseous discharge device with said secondary and said element, said element serving to provide a voltage component additive to the voltage of the said secondary winding but only after current flows in said element, and means including a condenser connected in circuit with said element for causing said current to flow upon energization of the primary, said element being arranged in voltage bucking relationship with said secondary prior to flow of current therethrough and said additive voltage component being produced by reason of the phase reversal therein when said current flows.

28. In combination with a gaseous discharge device a transformer having a primary and a secondary, an element of high reactance inductively arranged relative to the primary, means connecting the gaseous discharge device in a circuit excluding the primary and including at least said secondary and said element, the open circuit voltage of said secondary and said element being less than the ignition voltage of said device, said element serving to provide a voltage component additive to the voltage of said secondary but only after lagging current flows in said element, and means connected in circuit with said element for causing said lagging current to flow through said element upon energization of the primary, said element being arranged in voltage bucking relationship with said secondary prior to flow of current therethrough and said additive voltage component being produced by reason of the phase reversal therein when said current flows.

29. In combination, two instant start gaseous discharge devices, means for operating the same from an A.C. source of voltage insufficient to ignite either device comprising an auto-transformer having a primary, a first inductively reactive portion of said transformer of high leakage and of relationship relative to the primary for having a voltage induced therein greater than that of the primary voltage, a second inductively reactive portion of said transformer of high leakage and of relationship relative to the primary for having a voltage induced therein, means for impressing the combined voltages of the primary and the said first reactive portion across one of said devices for igniting same, means connecting the second discharge device across the two reactive portions with the voltages of the two reactive portions in opposition to one another, said first portion producing after ignition of the first device a voltage having a component in reverse relation to the voltage across the first reactive portion prior to such ignition whereby it is additive relative to the voltage of the second reactive portions, the sum of said component voltage and the voltage of the second reactive portion being sufficient to ignite the second device.

30. In combination, two gaseous discharge devices, a transformer having three windings comprising a primary, first secondary, and second secondary, means forming a series circuit including one of said devices across the primary and the first secondary, means forming a series circuit including the other of said devices across the two secondaries with the voltages of the two secondaries in bucking relationship, the first of said secondaries having relatively high inductive reactance whereby to impede flow of current therethrough after ignition of both devices.

31. An operating circuit for at least two discharge devices, comprising a transformer having a primary, a first secondary and a second secondary, a first gas discharge device connected in a loop with the two secondaries and the voltages of said secondaries in opposition to one another in said loop prior to the flow of current through the secondaries whereby at that time their effective voltage is a function of the difference between the voltages across the two secondaries, a second gas discharge device connected across at least a major portion of the primary and the first but not the second of the two secondaries, the first secondary being in step-up autotransformer relationship to the primary, a magnetic structure coupling the primary with the two secondaries, the secondaries being more closely coupled to the primary than to one another, said first secondary taking a lagging current upon starting of current flow therethrough whereby after current commences to flow therethrough the direction of the voltage across the first secondary is substantially reversed with respect to the voltage induced in the other secondary and the voltage across the device in said first loop becomes a function of the sum of the voltages across the two secondaries, said first secondary being of substantially higher reactance than that of the other secondary.

32. An operating circuit for at least two discharge devices, comprising a transformer having a primary, a first secondary, and a second secondary, a first gas discharge device connected in a series circuit including the primary and only the first one of the two secondaries, a second gas discharge device connected in a loop which includes both secondaries with their open circuit voltages in opposition in said loop and which excludes the primary, the first secondary being more closely coupled with the primary than it is with the second secondary and having a relatively high inductive reactance whereby to impede flow of current therethrough after ignition of the devices, and thereby forcing the current to flow in series through said devices and the second secondary.

33. In apparatus of the character described, an iron core auto-transformer having a primary, a first secondary, and a second secondary, a gaseous discharge device in a circuit across the primary and first secondary together, a second gaseous discharge device in a circuit across the secondaries together, the secondaries being arranged with their open circuit voltages opposing one another in said last mentioned circuit, the primary and first secondary having sufficient turns to provide a voltage for igniting the first of said devices when the primary is energized by said source, and the secondaries having sufficient turns to provide a combined voltage sufficient for igniting the second device but being inductively arranged additively to combine their voltages only after ignition of said first device, and means comprising a magnetic shunt establishing a high leakage reactance in said first secondary to prevent substantial passage of current therethrough after ignition of both devices so that the devices and second secondary are connected in an effective series circuit.

34. Apparatus for igniting and operating at least one gaseous discharge device, comprising a transformer having a primary, a winding adapted to be connected in a circuit to ignite and operate said gaseous discharge device, means for connecting said primary to a relatively low voltage A.C. source of power for excitation thereof, an element of high reactance inductively arranged relative to the primary being in series voltage relationship with and serving to provide a voltage component additive to the said winding, but only after current flows in said element, and gaseous discharge means connected with said element for causing said current to flow after energization of the primary, said element being arranged in voltage bucking relationship with said winding prior to flow of current therethrough and said additive voltage component being produced by reason of the phase reversal therein when said current flows.

35. In a gaseous discharge tube lighting system, a transformer including a core provided with an air gap and primary and secondary windings arranged on said core, the primary coil being connected across a source of alternating current of predetermined frequency, a pair of output terminals for the transformer connected one to one end of the primary and the other to one end of the secondary, the opposite end of the secondary being connected to the primary, a tube circuit comprising at least a pair of gaseous discharge tubes connected in series with each other across the output terminals of the transformer, a series condenser connected in the tube circuit in series with both tubes, a by-pass impedance connected in the tube circuit in series with one tube and in parallel with the other tube, the transformer secondary being arranged to have an inductive reactance in the operating frequency which is lower than the impedance of the said series condenser and the by-pass impedance at the operating frequency, the secondary being located on said core between the primary and the air gap portion of the core, and the transformer primary by reason of the air gap carrying an appreciable exciting current, the arrangement of the system being such that the exciting current is inductive and lagging in nature and combined vectorially with the leading load current to provide a high power factor operation with a minimum of wave shape distortion.

36. Apparatus for starting and operating a pair of gaseous discharge devices from an alternating voltage source, comprising a transformer structure having a primary winding, a high leakage reactance secondary winding, and an auxiliary winding of low current capacity, connections for energizing said primary winding from said source, a ballasting capacitor, a leading current operating circuit comprising at least said secondary winding and said ballasting capacitor and connections for including both said devices in series, a second capacitor, and a leading current loop comprising connections for including one only of said devices, both said capacitors, and at least both of the secondary windings in series, said secondary windings being connected in aiding voltage relationship within said loop.

37. In combination, a pair of gaseous discharge devices, a transformer structure having a primary winding, a high leakage reactance secondary winding and an auxiliary winding of low current capacity, connections for energizing said primary winding from said source, a leading current operating circuit comprising at least said secondary winding, a ballasting capacitor, and said devices connected in series, and a leading current loop comprising one only of said devices, said ballasting capacitor, and at least said high leakage reactance secondary winding and said auxiliary winding in series.

38. Apparatus for starting and operating a pair of gaseous discharge devices from an alternating voltage source, comprising a transformer structure having a primary winding, a high leakage reactance secondary winding, and an auxiliary winding of low current capacity, connections for energizing said primary winding from said source, a current-limiting condenser, an operating circuit comprising at least said secondary winding and said primary winding and said current limiting condenser and connections for including both of said devices in series, a second current limiting condenser, and a leading current starting loop comprising connections for including only one of said devices, at least said second current limiting condenser and at least said auxiliary winding and said secondary winding.

39. A ballast transformer for a pair of electric discharge devices comprising a capacitor adapted to be connected in series with one of said devices, a core, a primary coil wound on said core and adapted to be connected to a source of alternating current, a pair of serially connected high leakage reactance secondary coils wound on said core and adapted to be connected across said one device, said secondary coils being so wound that their voltages are additive thereby to start said one device, one of said secondary coils being adapted to be connected in auto-transformer relation with said primary coil across said other device after starting of said one device thereby to start said other device.

40. A ballast transformer for a pair of electric discharge devices comprising a capacitor adapted to be connected in series with one of said devices, a core, a primary coil wound on said core and adapted to be connected to a source of alternating current, a pair of serially connected high leakage reactance secondary coils wound on said core and adapted to be connected across said one device, said secondary coils being so wound that their voltages are additive thereby to start said one device, one of said secondary coils being adapted to be connected in auto-transformer relation with said primary coil across said other device after starting of said one device thereby to start said other device, said one secondary coil being adapted to connect in series with said devices during operation thereof thereby to limit current flow therethrough.

References Cited in the file of this patent
UNITED STATES PATENTS

| | | |
|---|---|---|
| 2,025,471 | Osborne | Dec. 24, 1935 |
| 2,354,879 | Ranney | Aug. 1, 1944 |
| 2,358,810 | Karash | Sept. 26, 1944 |
| 2,382,638 | Keiser et al. | Aug. 14, 1945 |
| 2,424,505 | Rupersburg | July 22, 1947 |
| 2,429,415 | Lemmers | Oct. 21, 1947 |
| 2,472,140 | Berger | June 7, 1949 |
| 2,472,882 | Berger | June 14, 1949 |
| 2,473,420 | Freeman | June 14, 1949 |
| 2,558,293 | Feinberg | June 26, 1951 |